March 9, 1965

H. C. DANIEL ETAL 3,172,654

WORK CLAMPING DEVICE

Filed Oct. 2, 1962

INVENTORS:
HAROLD C. DANIEL and
WILLIAM F. SOUTHARD
BY

Eaton, Bell, Hunt & Bettzer
ATTORNEYS

United States Patent Office 3,172,654
Patented Mar. 9, 1965

3,172,654
WORK CLAMPING DEVICE
Harold C. Daniel, 104 Forest Hills Drive, and William F. Southard, 1206 Lucille Ave., both of Monroe, N.C.
Filed Oct. 2, 1962, Ser. No. 227,789
3 Claims. (Cl. 269—93)

The present invention relates to a work clamping device for clamping workpieces in position to be worked upon and more particularly, to such a work clamping device which is quickly engaged and disengaged.

Conventionally, workpieces which are to be machined by several different types of machines, including drilling machines, grinding machines, milling machines, planing machines, turning machines, welding apparatus, broaching machines, and other similar type machines, are clamped in position to be worked upon by one or more workpiece clamps. Conventional work clamps normally require considerable time to move the work clamping jaws or members thereof into clamping engagement with the workpiece. This is occasioned by the relatively small lead of the threads on the bolts and hexagonal nuts conventionally used for moving the upper workpiece clamping member toward the lower workpiece clamping member or machine worktable. Several revolutions of the nut are usually required to force these clamping members into clamping engagement with the workpiece, which revolutions must be made by means of a suitable wrench. Also, considerable time is required to initially set up conventional work clamps or to change these work clamps for clamping a different size workpiece.

It is therefore an object of the present invention to provide an improved work clamping device which is constructed and arranged for quickly clamping and quickly releasing workpieces in position to be worked upon and which is quickly and easily initially set up or changed for receiving and clamping different sizes of workpieces.

A more specific object of the present invention is to provide a work clamping device of the character described wherein a work clamping member is moved into or out of clamping engagement with a workpiece to clamp the same between this member and a base member upon a fraction of a revolution of rotative movement of a clamp nut disposed thereabove.

A still more specific object of the present invention is to provide a clamping device of the character described wherein said clamping device includes an elongate handle extending radially outwardly from the clamp nut for facilitating rotation of the same a fraction of a revolution to quickly move the work clamping member into clamping engagement with a workpiece.

Some of the objects of the invention having been stated, other objects will appear as the description proceeds when taken in connection with the accompanying drawings, in which—

Figure 1:
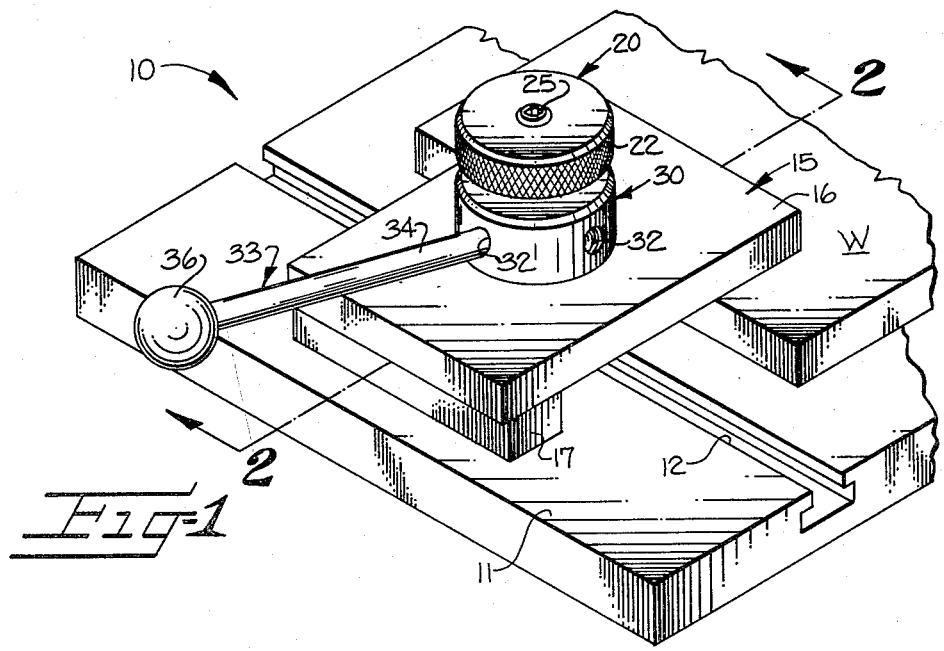
Figure 2:
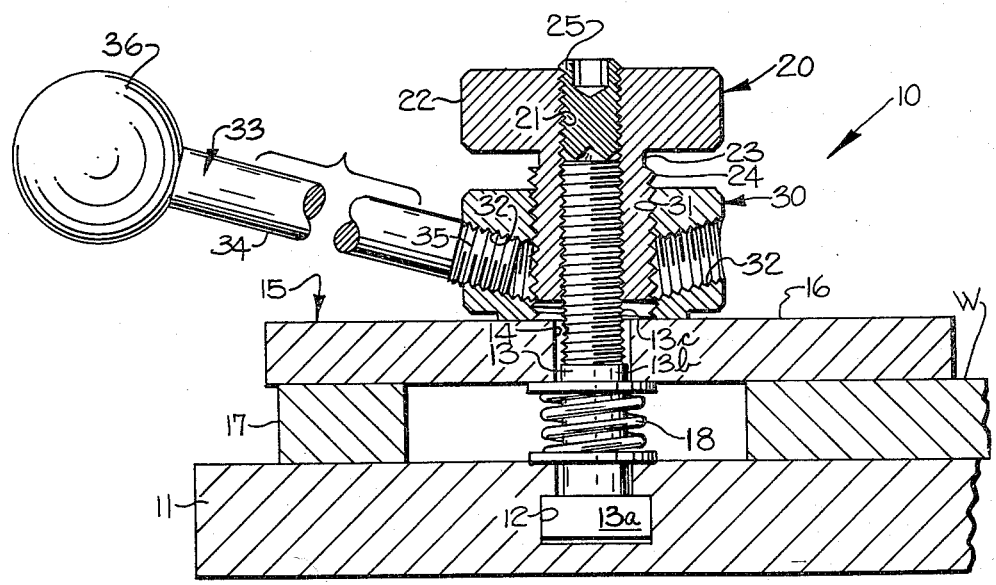

FIGURE 1 is a fragmentary isometric view of the work clamping device of the present invention, and FIGURE 2 is a vertical section taken substantially along line 2—2 in FIGURE 1.

Referring now to the drawings, the improved work clamping device of the present invention is generally indicated at 10 and includes a base member 11 which is preferably the worktable of any one of the aforementioned types of machines. Base member or worktable 11 preferably has an elongate T-slot 12 therein for adjustably mounting the remaining portions of the work clamping device thereon.

A bolt 13 has a head portion 13a at one end disposed in T-slot 12 for sliding movement therealong and a stem portion 13b extending upwardly from head portion 13a. Stem portion 13b is preferably externally threaded as indicated at 13c for a considerable portion thereof downwardly from its upper end.

Stem portion 13b of bolt 13 penetrates through a vertical opening 14 formed in the central portion of a workpiece engaging or clamping member 15. Workpiece clamping member 15 comprises a body portion 16 and a foot portion 17 mounted on body portion 16 or formed integral therewith at one end thereof and which normally rests on the machine worktable 11 to space the body portion 16 of the work clamping member 15 above worktable 11 a distance substantially equal to the thickness of a workpiece W to be clamped between workpiece clamping member 15 and table 11. It is noted that foot portion 17 may be separate from body portion 16 and merely disposed between body portion 16 and worktable 11. If foot portion 17 is separate, workpiece engaging member 15 may be set up for different sizes of workpieces by substituting different heights of foot portions.

A compression spring 18 is disposed in surrounding relation to bolt 13 beneath body portion 16 of workpiece clamping member 15 for biasing the same away from base member or worktable 11. The portion of body portion 16 of work clamping member 15 on the opposite side of opening 14 therein from foot portion 17 defines a workpiece engaging portion which is adapted to receive the workpiece W therebeneath to clamp the workpiece between body portion 16 and worktable or base member 11.

An adjusting bushing 20 has a centrally located, internally threaded opening 21 extending therethrough having threads therein which cooperate with external threads 13c on bolt 13. Bushing 20 includes a head portion 22 at its upper end and a reduced diameter portion 23 depending from head portion 22. Reduced diameter portion 23 is externally threaded as indicated at 24, which external threads have a greater lead than the internal threads in opening 21 and external threads 13c on bolt 13. Head portion 22 of adjusting bushing 20 has the periphery thereof knurled to provide a surface having an increased coefficient of friction for facilitating manual rotation of adjusting bushing 20 on bolt 13. It is noted that adjusting bushing 20 is rotated on bolt 13 to position the lower end of reduced diameter portion 23 slightly above or in slight engagement with workpiece clamping member 15. A locking or set screw 25 is threadably mounted in the upper portion of opening 21 in bushing 20 and is movable into engagement with the upper end of bolt 13 to exert an upward force on bushing 20 to bind the threads in opening 21 and the threads 13c on bolt 13 to lock adjusting bushing 20 on bolt 13 when the same has been moved to the desired adjusted position relative to workpiece clamping member 15.

A clamp nut 30 has an internally threaded opening 31 extending vertically therethrough and is threadably mounted on reduced diameter portion 23 of adjusting bushing 20. It is noted that the internal threads in opening 31 of clamp nut 30 are of the same lead as threads 24 on reduced diameter portion 23 of adjusting bushing 20 which gives a large movement of clamp nut 30 longitudinally of adjusting bushing 20 upon only a fraction of a revolution of rotation of clamp nut 30 relative to adjusting bushing 20. Clamp nut 30 also has a plurality of internally threaded radially extending openings 32 therein at spaced points around its periphery. Openings 32 preferably communicate with opening 31 at their inner ends and extend outwardly therefrom at an acute angle to the horizontal.

An elongate handle 33 includes a stem portion 34 having an externally threaded portion 35 at one end which is selectively disposed in one of the openings 32 in clamp nut 30. A knob 36 is mounted on the other end of stem portion 34 for ready grasping by the machine operator for facilitating rotation of clamp nut 30 on adjusting bushing 20.

While it is preferred that the above-described workpiece clamping member 15 be used in the clamping device of the present invention, it should be understood that a workpiece clamping member of any suitable configuration may be used without departing from the scope of the present invention.

In operation, clamping device 10 is set up by positioning bolt 13 on base member 11 and by mounting workpiece clamping member 15 with the desired height foot portion 17 on bolt 13. Adjusting bushing 20 with clamp nut 30 thereon is positioned on bolt 13, adjusted thereon relative to workpiece clamping member 15 and locked in adjusted position. When it is desired to clamp a workpiece W, the workpiece is disposed on base member 11 with a portion thereof beneath the workpiece engaging portion of clamping member 15. The operator then grasps knob 36 of handle 33 and rotates clamping nut 30 relative to adjusting bushing 20 for a fraction of a revolution which moves the same downwardly into engagement with workpiece clamping member 15 and thereby forces workpiece clamping member 15 toward base member 11 to clamp the workpiece therebetween.

It is noted that the large lead of the cooperating threads of clamping nut 30 and adjusting bushing 20 results in a large movement of clamping nut 30 along adjusting bushing 20 upon a fraction of a revolution of rotation therebetween such that clamping nut 30 is quickly moved into or out of engagement with workpiece clamping member 15. It is further noted that clamping device 10 is quickly and easily set up for different sizes of workpieces by substituting foot portions of different height and by unlocking adjusting bushing 20 from bolt 13 and adjusting the same relative thereto.

It is therefore apparent that an improved work clamping device is provided which is quickly moved into or out of engagement with a workpiece for releasably clamping a workpiece in position to be worked upon in a minimum amount of time and with a minimum effort on the part of the machine operator.

In the drawings and specification there has been set forth a preferred embodiment of the invention and, although specific terms are employed, they are used in a generic and descriptive sense only and not for purposes in limitation, the scope of the invention being defined in the claims.

We claim:

1. A quick engage, quick release work clamping device for securing workpieces in position to be worked upon, said clamping device comprising
   (a) a base member,
   (b) an externally threaded bolt non-rotatably mounted on said base member and extending outwardly therefrom,
   (c) a workpiece clamping member slidably mounted on said bolt for movement relative thereto toward and away from said base member and being adapted to cooperate with said base member to clamp a workpiece therebetween,
   (d) spring means disposed between said workpiece clamping member and said base member for biasing said workpiece clamping member away from said base member,
   (e) an internally and externally threaded adjusting bushing mounted on said bolt for longitudinal adjustment therealong on the opposite side of said workpiece clamping member from said base member, the external threads on said adjusting bushing having a greater lead than the internal threads thereon,
   (f) locking means carried by said adjusting bushing for locking said adjusting bushing in adjusted position on said bolt, and
   (g) a clamp nut threadably mounted on said adjusting bushing for rapid longitudinal adjustment therealong into and out of engagement with said workpiece clamping member for moving said workpiece clamping member toward said base member to clamp a workpiece between said workpiece clamping member and said base member.

2. A quick engage, quick release clamping device for securing workpieces in position to be worked upon, said clamping device comprising
   (a) a base member,
   (b) an externally threaded bolt non-rotatably mounted on said base member and extending upwardly therefrom,
   (c) a workpiece clamping member slidably mounted on said bolt for vertical movement relative thereto toward and away from said base member and adapted to cooperate with said base member to clamp a workpiece therebetween,
   (d) spring means surrounding said bolt means between said workpiece clamping member and said base member for biasing said workpiece clamping member away from said base member,
   (e) an adjusting bushing having an internally threaded opening extending vertically therethrough, said internally threaded opening matingly receiving a portion of said bolt therein to mount said adjusting bushing on said bolt for vertical adjustment therealong above said workpiece clamping member, said adjusting bushing extending upwardly from the upper end of said bolt and having a knurled head portion at its upper end to facilitate adjustment of said adjusting bushing relative to said bolt and said workpiece clamping member, said adjusting bushing having an externally threaded, reduced diameter portion depending from said head portion with the external threads on said reduced diameter portion of said adjusting bushing having a greater lead than the internal threads thereon,
   (f) a lock screw mounted in the internally threaded opening of said adjusting bushing above said bolt and engageable with the upper end of said bolt to lock said adjusting bushing in adjusted position thereon, and
   (g) a clamp nut surrounding and threadably mounted on said reduced diameter portion of said adjusting bushing for quick vertical adjustment therealong into engagement with said workpiece clamping member to move said workpiece clamping member downwardly toward said base member to quickly clamp a workpiece therebetween.

3. A quick engage, quick release clamping device for securing workpieces in position to be worked upon, said clamping device comprising
   (a) a base member having a T-slot therein,
   (b) a bolt having a head portion non-rotatably disposed in the T-slot in said base member and having an externally threaded stem portion extending upwardly therefrom,
   (c) a workpiece clamping member slidably mounted on said stem portion of said bolt for vertical movement relative thereto toward and away from said base member and adapted to cooperate with said base member to clamp a workpiece therebetween, said workpiece clamping member having a foot portion normally resting on said base member and a workpiece engaging portion normally spaced above said base member,
   (d) spring means surrounding said stem portion of said bolt between said workpiece clamping member and said base member for biasing said workpiece clamping member away from said base member,
   (e) an internally and externally threaded adjusting bushing mounted on said bolt for vertical adjustment therealong above said workpiece clamping member, the external threads on said adjusting bushing having a greater lead than the internal threads thereon,
(f) a lock screw carried by said adjusting bushing and engageable with said bolt for locking said adjusting bushing in adjusted position on said bolt,
(g) a clamp nut surrounding and threadably mounted on said adjusting bushing for quick vertical adjustment therealong into engagement with said workpiece clamping member to move said workpiece clamping member downwardly toward said base member, said clamp nut having a plurality of internally threaded, radially extending openings therein at spaced points around its periphery, and
(h) an elongate handle having an externally threaded portion at one end selectively disposed in one of said radially extending openings in said clamp nut for facilitating rotation of said clamp nut relative to said adjusting bushing.

References Cited in the file of this patent
UNITED STATES PATENTS

| | | |
|---|---|---|
| 282,033 | Amborn et al. | July 31, 1883 |
| 1,350,773 | Bentley | Aug. 24, 1920 |
| 1,404,275 | Cowles | Jan. 24, 1922 |
| 2,306,079 | Oldham | Dec. 22, 1942 |
| 2,428,111 | Eldrup | Sept. 30, 1947 |
| 2,796,899 | Biro | June 25, 1957 |
| 3,016,805 | Kehde | Jan. 16, 1962 |